US012570131B1

(12) United States Patent
Powell et al.

(10) Patent No.: US 12,570,131 B1
(45) Date of Patent: Mar. 10, 2026

(54) ELECTRIC AXLE WITH SPACE EFFICIENT SHIFT ASSEMBLY

(71) Applicant: Dana Automotive Systems Group, LLC, Maumee, OH (US)

(72) Inventors: Benjamin Powell, Austin, TX (US); Douglas Bradley, Sterling Heights, MI (US); Sakthikumar Rathakrishnan, Perrysburg, OH (US); Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/959,227

(22) Filed: Nov. 25, 2024

(51) Int. Cl.
  B60K 1/00 (2006.01)
  B60K 17/16 (2006.01)

(52) U.S. Cl.
  CPC .............. B60K 1/00 (2013.01); B60K 17/165 (2013.01); *B60K 2001/001* (2013.01)

(58) Field of Classification Search
  CPC ... B60K 1/00; B60K 17/165; B60K 2001/001
  See application file for complete search history.

(56) References Cited

U.S. PATENT DOCUMENTS

| | | | |
|---|---|---|---|
| 7,399,251 B2 | 7/2008 | Mueller et al. |
| 8,870,698 B2 | 10/2014 | Mack et al. |
| 9,328,775 B2 | 5/2016 | Schoolcraft |
| 9,447,873 B2 | 9/2016 | Pritchard |
| 9,593,754 B2 | 3/2017 | Sten |
| 9,637,127 B1 | 5/2017 | Cooper |
| 9,707,834 B2 | 7/2017 | Lee et al. |
| 10,480,631 B2 | 11/2019 | Dzafic et al. |
| 10,801,602 B2 | 10/2020 | Peng et al. |
| 11,085,537 B2 | 8/2021 | Kwon et al. |
| 11,149,823 B2 | 10/2021 | Engerman |
| 11,209,072 B2 | 12/2021 | Ghatti et al. |
| 11,280,391 B2 | 3/2022 | Engerman |
| 11,313,459 B2 | 4/2022 | Nakao et al. |
| 11,460,096 B2 | 10/2022 | Ziech |
| 11,667,189 B1 | 6/2023 | Engerman et al. |
| 11,845,329 B2 | 12/2023 | Chopra et al. |
| 2015/0151634 A1 | 6/2015 | Smetana |

(Continued)

FOREIGN PATENT DOCUMENTS

| | | | | |
|---|---|---|---|---|
| CN | 113928101 A | 1/2022 | | |
| DE | 102018131489 A1 * | 6/2020 | ............. | F16H 3/663 |
| EP | 3724015 B1 | 7/2021 | | |

OTHER PUBLICATIONS

Ziskovsky, D. et al., "Electric Axle and Electric Axle Product Line," U.S. Appl. No. 18/894,520, filed Sep. 24, 2024, 40 pages.

*Primary Examiner* — Farhana Pervin
(74) *Attorney, Agent, or Firm* — McCoy Russell LLP

(57) ABSTRACT

A system and method for an electric axle. The electric axle includes, in one example, a traction motor and an input planetary gear set arranged coaxial to the traction motor. The input planetary gear set includes a sun gear rotationally coupled to the traction motor and a carrier rotationally coupled to a shift sleeve. The electric axle further includes a multi-speed planetary gear set that is arranged coaxial to the input planetary gear set and a shift assembly that includes the shift sleeve positioned axially between the input planetary gear set and the multi-speed planetary gear set.

13 Claims, 8 Drawing Sheets

(56)        References Cited

U.S. PATENT DOCUMENTS

2015/0330492 A1    11/2015  Lee et al.
2017/0144540 A1*    5/2017  Kincaid  .................. F16D 11/14
2022/0325791 A1*   10/2022  Soave  .................... F16H 61/24
2023/0003289 A1*    1/2023  Gowrisankar  ......... B60K 17/04
2023/0339315 A1*   10/2023  Engerman  ............. F16H 37/082
2024/0066971 A1*    2/2024  Kaltenbach  ........... B60K 6/547
2024/0200613 A1*    6/2024  Hans  ...................... F16D 21/02
2024/0418251 A1*   12/2024  Lee  ........................ F16H 48/40

* cited by examiner

ELECTRIC AXLE WITH SPACE EFFICIENT SHIFT ASSEMBLY

TECHNICAL FIELD

The present disclosure relates to an electric axle with a shift assembly that includes a multi-speed clutch.

BACKGROUND AND SUMMARY

Segments of the vehicle market are moving towards electrification. The inventors have recognized a need to further increase electric powertrain compactness and power output in a cost effective package. Attempts have been made to develop electric axles for hybrid and all-electric vehicle platforms. Electric axles include motors, gear trains, and differentials that are packaged together for delivering power to drive wheels. Certain vehicle platforms have made use of multi-speed electric axles to increase axle efficiency. However, difficulties arise when attempting to package shifting features into the axle in a space efficient manner, particularly with regard to cross-vehicle packaging space.

The inventors have recognized the abovementioned challenges and developed an electric axle to at least partially overcome the challenges. The electric axle includes, in one example, an electric axle is provided that includes a traction motor and an input planetary gear set arranged coaxial to the traction motor. The input planetary gear set includes a sun gear that is rotationally coupled to the traction motor and a carrier including a section that is rotationally coupled to a shift sleeve. The electric axle further includes a multi-speed planetary gear set that is arranged coaxial to the input planetary gear set and a shift assembly that includes the shift sleeve. The shift sleeve is positioned axially between the input planetary gear set and the multi-speed planetary gear set. The shift assembly is configured to, in a first positon, rotationally couple the carrier to a sun gear in the multi-speed planetary gear set and in a second position, rotationally couple the carrier to a carrier in the multi-speed planetary gear set. In this way, an electric axle with a space efficient shift assembly architecture is achieved with multi-speed functionality. Consequently, the electric axle is able to be incorporated into a wider variety of vehicle platforms, thereby increasing customer appeal.

In one example, the shift assembly is configured to, in a neutral position, rotationally decoupled the input planetary gear set from the multi-speed planetary gear set. In this way, the efficiency of the electric axle can be increased when drive mode is not desired.

Further in one example, the shift assembly may include an actuation motor that is mechanically coupled to a shift fork that mates with a recess in the shift sleeve. In such an example, the shift assembly may further include one or more cam gears that are rotationally coupled to the actuation motor and a cam plate that is rotationally coupled to the one or more gears. Additionally, in the shift assembly, a shift pin in the shift fork mates with the cam plate. In this way, the shift assembly construction cross vehicle packaging space.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Electric axles are described herein that achieve a decrease in cross-vehicle packaging space through the use of a sliding clutch that is arranged between an input planetary gear set and a multi-speed planetary gear set and a shift actuation assembly for the sliding clutch that is space efficiently positioned above the multi-speed planetary gear set. The sliding clutch is designed to shift between low, neutral, and high gear states. The electric axle includes a sliding clutch positioned axially between an input planetary gear set and a multi-speed planetary gear set and a shift fork for the sliding clutch is also positioned axially between the input planetary gear set and the multi-speed planetary gear set.

Figure 1:
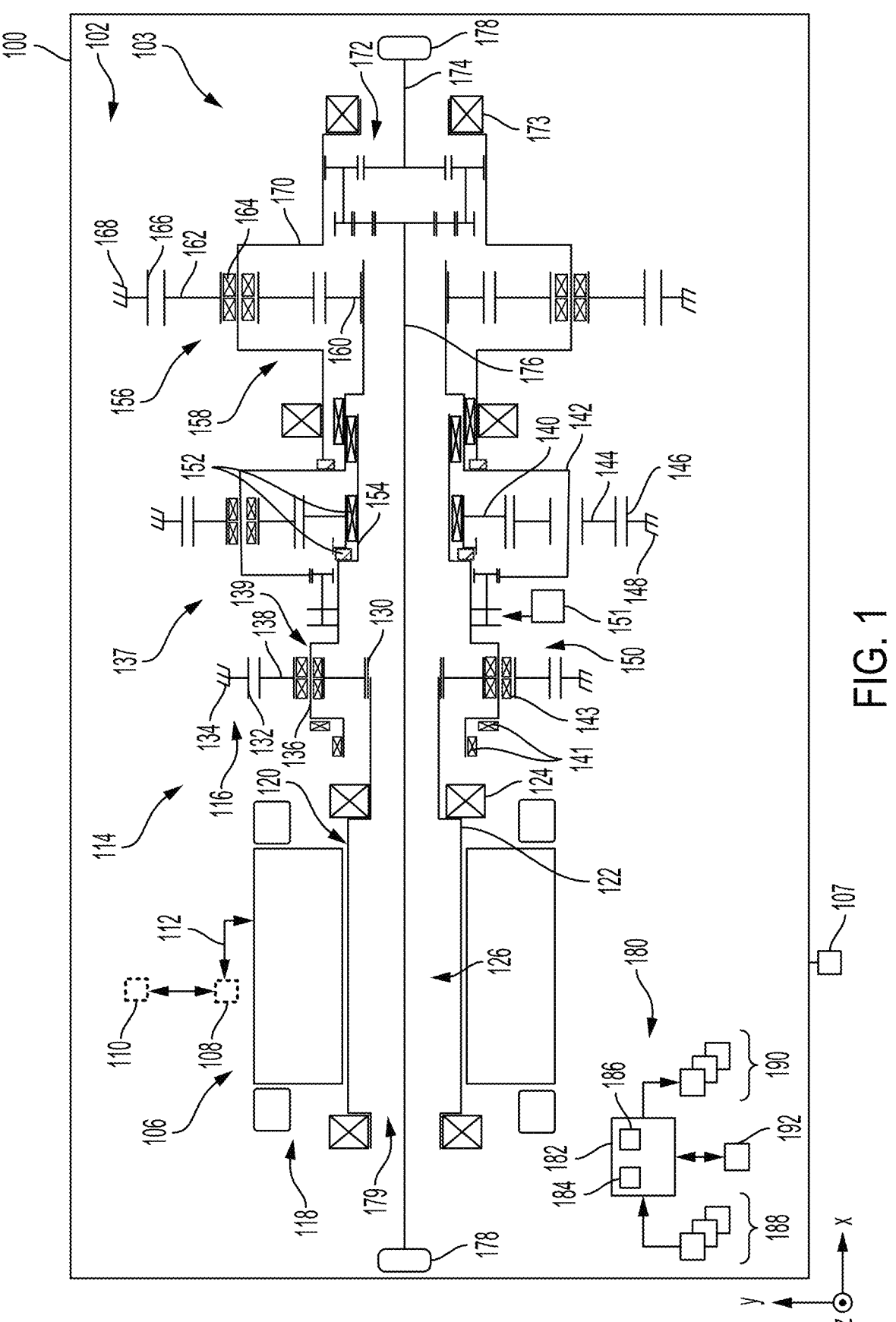
FIGS. 1-3 show different electric axle architectures with an input planetary gear set and a multi-speed planetary gear set.

FIG. 1 shows an electric vehicle (EV) 100 that includes a powertrain 102 with an electric axle assembly 103 with an electric axle 104 (e.g., a front electric axle, in one example). The EV 100 may be a hybrid EV in one example. Specifically, the ICE may be configured to charge a traction battery and/or other suitable energy storage device. In other examples, the EV 100 may be an all-electric vehicle (e.g., battery electric vehicle (BEV)).

As described herein an electric axle is an electric drive incorporated into an axle. The electric axle may be an electric beam axle, in one example. A beam axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The beam axle may be coupled to a dependent suspension system 107, in one example. Therefore, the electric axle may be an unsprung mass.

The electric axle 104 includes a traction motor 106. The traction motor 106 may be an electric motor-generator, for example. For instance, the traction motor 106 may be designed as a multi-phase alternating current (AC) motor-generator. However, in other examples, the electric machine may be a motor without generator capabilities.

As illustrated in FIG. 1, the traction motor 106 may be electrically coupled to an inverter 108. The inverter 108 is designed to convert direct current (DC) electric power to alternating current (AC) electric power and vice versa.

Therefore, the traction motor 106 may be an AC electric machine, as previously indicated. However, in other examples, the electric machine may be a DC electric machine and the inverter may therefore be omitted from the electric drive, in such an example. The inverter 108 may receive electric energy from one or more energy storage device(s) 110 (e.g., traction batteries, capacitors, combinations thereof, and the like). Arrows 112 signify the electric energy transfer between the traction motor 106, the inverter 108, and the energy storage device(s) 110 that may occur during different modes of electric axle operation (e.g., a drive mode and a regeneration mode). As such, during a drive mode, electric energy may flow from the energy storage device(s) 110 to the traction motor 106 and during a regenerative mode, electric energy may flow in the opposite direction from the electric machine to the energy storage device(s). The inverter 108 may be integrated into the electric axle 104, in one example.

The traction motor 106 includes a stator 118 and a rotor 120 that includes a rotor shaft 122. Bearings 124 are coupled to the rotor shaft 122 and enable rotation thereof. Further, the rotor shaft 122 includes a central opening 126 to enable an axle shaft 176 to pass therethrough, as discussed in greater detail herein.

The electric axle 104 further includes a gear train 114 that is coaxially arranged with the traction motor 106, thereby enabling the electric axle to achieve a space efficient package that is able to be more easily integrated into a wider variety of vehicle platforms.

The gear train 114 includes an input planetary gear set 116. The rotor shaft 122 is either directly coupled to the input planetary gear set 116 or coupled to the input planetary gear set using an intermediary shaft.

Specifically, in the illustrated example, the input planetary gear set 116 is a simple planetary gear set. A simple planetary gear set is a planetary gear set that solely includes a ring gear, a set of planet gears, a carrier, and a sun gear. To elaborate, as described herein a simple planetary gear set is a planetary gear set with solely a ring gear, a sun gear, a carrier, and multiple planet gears that are in the same plane as the ring gear and the sun gear and rotate on the carrier. Further, in the simple planetary gear set, each planet gear meshingly engages both the sun gear and the ring gear. However, in other examples, the input planetary gear set may be a different type of planetary gear set such as a compound planetary gear set.

The input planetary gear set 116 includes a sun gear 130 that is rotationally coupled (e.g., directly rotationally coupled) to the rotor 120 of the traction motor 106. In the illustrated example, a ring gear 132 in the input planetary gear set 116 is mechanically grounded via a stationary component 134 such as a housing or other suitable component. In this way, the input planetary gear set achieves a desired gear reduction ratio. A carrier 136 is coupled to a downstream component, in the illustrated example. To elaborate, a section 139 of the carrier 136 is coupled to the downstream component. In the illustrated example, the downstream component is a multi-speed planetary gear set 137 that is discussed in greater detail herein. However, in other examples, another component in the input planetary gear set may be coupled to the downstream component. The input planetary gear set 116 further includes multiple planet gears 138 that are rotatably mounted to the carrier 136.

Bearings 141 are coupled to the carrier 136, in the illustrated example. The carrier 136 is formed of removably attached sections to increase the modularity of the electric axle 104. The construction of the carrier is expanded upon herein with regard to at least FIGS. 9-10. As shown in FIG. 1, bearings 143 (e.g., needle roller bearings) are coupled to the carrier 136 and the set of planet gears 144.

The multi-speed planetary gear set 137 includes a sun gear 140, a carrier 142, a set of planet gears 144 that are rotatably mounted on the carrier 142, and a ring gear 146. In the illustrated example, the ring gear 146 is mechanically grounded via a stationary component 148.

To achieve the multi-speed functionality, the multi-speed planetary gear set 137 includes a clutch 150. In a first position the clutch 150 rotationally couples the carrier 136 to the sun gear 140. In a second positon the clutch 150 rotationally couples the carrier 136 to the carrier 142. The clutch 150 may further be configured to operate in a neutral position where power flow between the input planetary gear set 116 and the multi-speed planetary gear set 137 is inhibited. In this way, the clutch is able to operate in low, neutral, and high gear states and shift between these states. Bearings 152 are positioned between the sun gear 140 and a section 154 of the carrier 136.

The traction motor 106 may be configured to be operated to synchronize the speed of the input planetary gear set 116 with the multi-speed planetary gear set 137 during shifting transient. To elaborate, when transitioning between the lower and higher gear modes of the clutch the clutch may be placed in neutral. While the clutch is held in a neutral state, the traction motor 106 is operated to match the speed of the multi-speed planetary gear set. When the speed variance between the input planetary gear set 116 and the multi-speed planetary gear set 137 is within a desired range, the clutch is then moved into the first or second gear position.

An actuation assembly 151 for the clutch 150 is schematically depicted in FIG. 1. However, it will be understood that the actuation assembly has greater structural complexity that is expanded upon herein with regard to FIGS. 4-8.

The gear train 114 further includes an output planetary gear set 156 in the illustrated example. To elaborate, in the illustrated example, the carrier 142 is rotationally coupled to a carrier 158 in the output planetary gear set 156. The output planetary gear set 156 further includes a sun gear 160, multiple planet gears 162 that are rotationally mounted on the carrier 158 via bearings 164 (e.g., needle roller bearings), and a ring gear 166 that is grounded via a stationary component 168. A downstream section 170 of the carrier 158 is rotationally coupled to a differential 172. The differential 172 is a torque-sensing limited-slip differential in the illustrated example. However, other suitable types of differentials may be used in the electric axle 104 in other examples. A bearing 173 is coupled to the downstream section 170 of the carrier 158, in the illustrated example.

Axle shafts 174 and 176 are rotationally coupled to the differential 172 and drive wheels 178. Specifically, the axle shaft 176 extends through central openings 179 of the traction motor 106 and the planetary gear sets in the gear train 114. In certain examples, when end gear reductions may be coupled to the axle shafts.

The rotational axes of the traction motor 106, the input planetary gear set 116, the multi-speed planetary gear set 137, the output planetary gear set 156, the differential 172, and the axle shafts 174 and 176 are coaxially arranged.

The EV 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits.

The memory 186 includes known data storage mediums such as random access memory, read only memory, keep alive memory, combinations thereof, and the like.

The controller 182 may receive various signals from sensors 188 positioned in different locations in the EV 100 and the multi-speed electric axle 104, more specifically. The sensors may include an electric machine speed sensor, energy storage device temperature sensor(s), clutch position sensors, an energy storage device state of charge sensor(s), wheel speed sensors, and the like. The controller 182 may also send control signals to various actuators 190 coupled at different locations in the EV 100, and the multi-speed electric axle 104. For instance, the controller 182 may send signals to the inverter 108 to adjust the rotational speed of the traction motor 106. The other controllable components in the vehicle and powertrain may function in a similar manner with regard to command signals and actuator adjustment. For instance, the controller 182 may send signals to the clutch 150 to engage and disengage the clutch to operate the axle in different modes, which are expanded upon herein. The controller and control system shown in FIG. 1 may be used in the other electric axle examples described herein. The controller may further be configured to command shifts between operating gears in a multi-speed gear train via clutch operation commands.

The EV 100 may also include one or more input device(s) 192 (e.g., an accelerator pedal, a brake pedal, a gear selector, a differential locker actuator, a console instrument panel, a touch interface, a touch panel, a keyboard, combinations thereof, and the like) in electronic communication with the controller 182. The input device(s) 192, responsive to operator input, may generate an acceleration adjustment request, a gear shift request when the electric axle includes a multi-speed gear train, and the like.

An axis system is provided in FIG. 1 as well as FIGS. 2-10, for reference, when appropriate. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
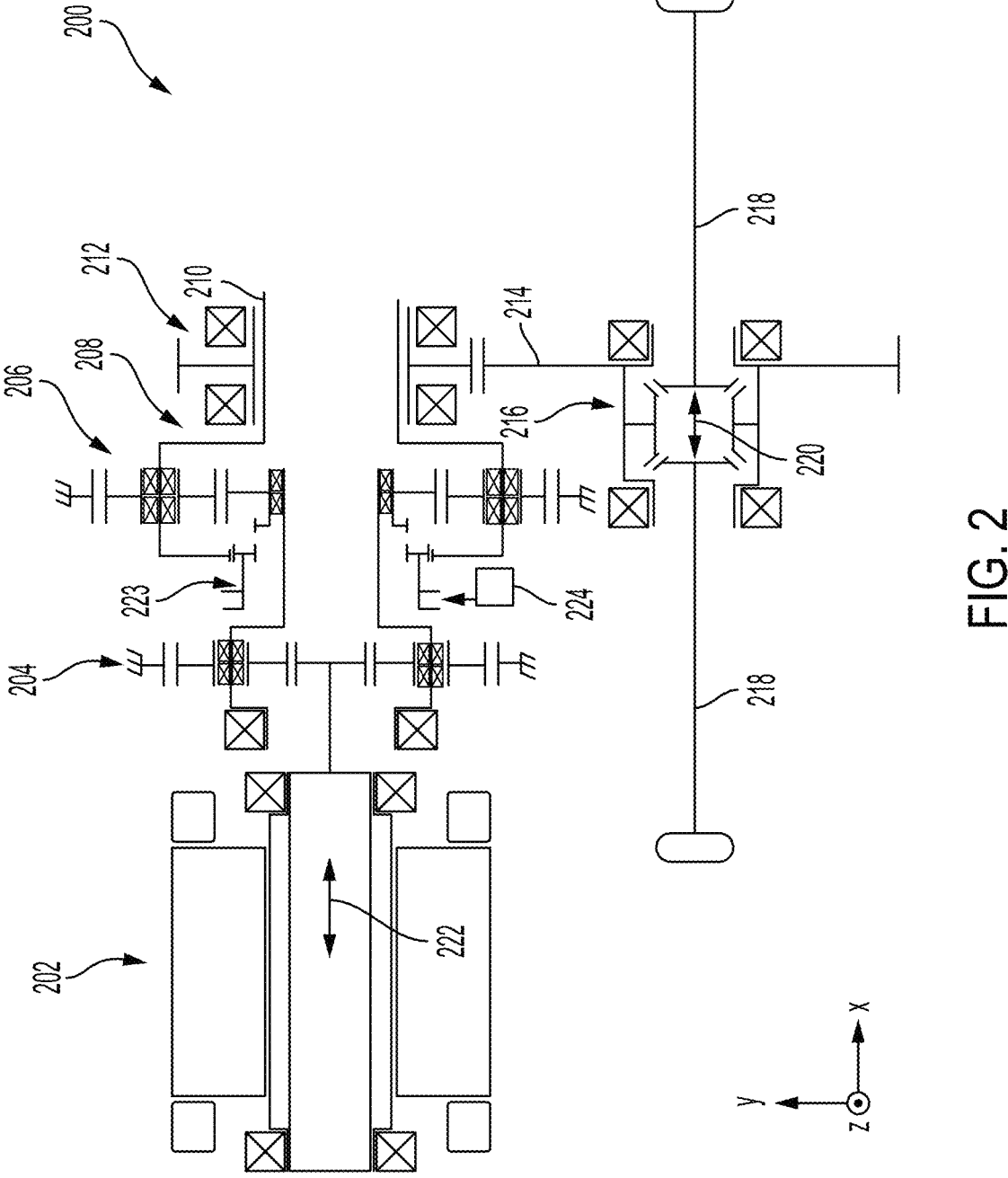

FIG. 2 shows another example of an electric axle 200 that includes a traction motor 202, an input planetary gear set 204, and a multi-speed planetary gear set 206. The traction motor 202 is similar to the traction motor 106 aside from the fact that the traction motor 202 does not include a central opening through which an axle shaft extends. The input planetary gear set 204 is similar to the input planetary gear set 116, shown in FIG. 1. Additionally, the multi-speed planetary gear set 206 is similar to the multi-speed planetary gear set 137, shown in FIG. 1, aside from the connection to the downstream component that is expanded upon herein. Redundant description of the overlapping components is omitted for brevity.

The multi-speed planetary gear set 206 include a carrier 208 with a downstream section 210 that is rotationally coupled to an output gear 212. The output gear 212 is positioned axially outboard of the multi-speed planetary gear set 206, in the exemplary electric axle architecture depicted in FIG. 2.

The output gear 212 meshes with an input gear 214 of a differential 216. Axle shafts 218 are rotationally coupled to the differential 216. The axle shafts 218, and therefore the rotational axis 220 of the differential 216, are parallel to but offset from a rotational axis 222 of the traction motor 202. Designing the electric axle in this manner decreases the axle's width. A clutch 223 and an actuation assembly 224 are again included in the electric axle 200.

Figure 3:
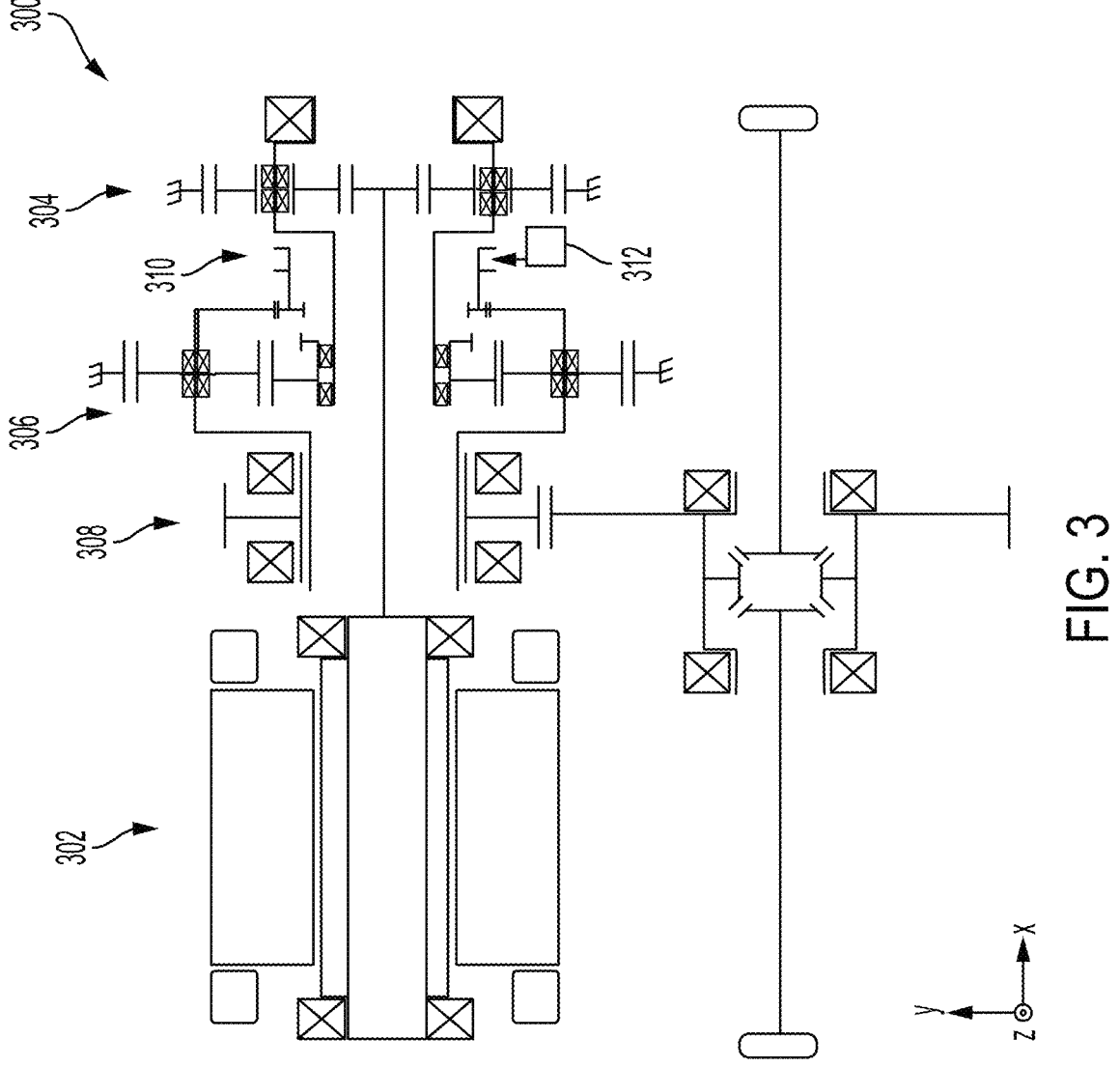

FIG. 3 shows another example of an electric axle 300 that includes a traction motor 302, an input planetary gear set 304, and a multi-speed planetary gear set 306. The traction motor 302 is similar to the traction motor 202, depicted in FIG. 2. The input planetary gear set 304 is similar to the input planetary gear set 204, shown in FIG. 2. Additionally, the multi-speed planetary gear set 306 is similar to the multi-speed planetary gear set 206, shown in FIG. 2, aside from the connection to the downstream component that is expanded upon herein. Redundant description of the overlapping components is omitted for brevity.

The input planetary gear set 304 and the multi-speed planetary gear set 306 have a different axial position with regard to one another when compared to the input planetary gear set 204 and the multi-speed planetary gear set 206, shown in FIG. 2. To expound, the input planetary gear set 304 is position axially outboard of the multi-speed planetary gear set 306. The multi-speed planetary gear set 306 is again rotationally coupled to an output gear 308. However, the output gear 308 is positioned axially between the traction motor 302 and the multi-speed planetary gear set 306. A clutch 310 and an actuation assembly 312 are again included in the electric axle 300.

Figure 4:
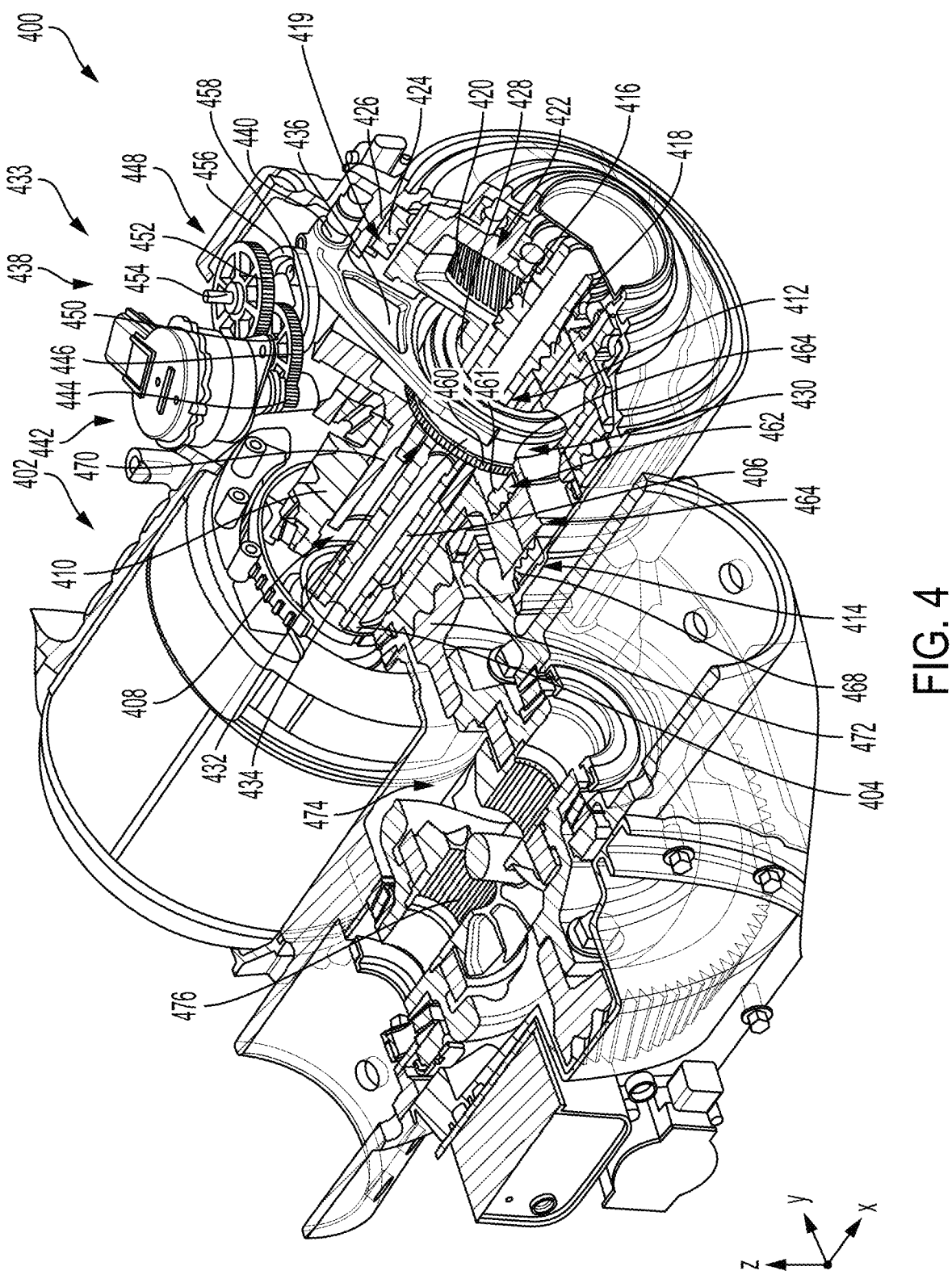
FIG. 4 shows a cross-sectional view of an example of an electric axle with a shift assembly.

FIG. 4 shows a detailed example of an electric axle 400. The electric axle 400 shown in FIG. 4 has a similar architecture to the electric axle 300 depicted in FIG. 3. However, it will be understood that the shift assembly depicted in FIG. 4 may be incorporated into other suitable electric axle architectures, such as the electric axles depicted in FIGS. 1-2.

The electric axle 400 again includes a traction motor 402 with a rotor shaft 404 that is rotationally coupled to (e.g., splined, bolted, welded, combinations thereof, and the like) a shaft 406 which extends through an opening 408 in an output gear 410, and an opening 412 in a multi-speed planetary gear set 414.

A gear 416 is arranged on the shaft 406 and meshes with a sun gear 418 in an input planetary gear set 419. In the illustrated example, the input planetary gear set 419 includes planet gears 420 that are rotatably mounted on a carrier 422 mesh with the sun gear 418 and a ring gear 424 that is grounded via a housing 426.

Further, in the illustrated example, the carrier 422 includes a section 428 that is rotationally coupled to a shift sleeve 430 of a clutch 432 (e.g., a sliding clutch). The clutch 432 is included in a shift assembly 433 that also includes an actuation assembly which is discussed in greater detail herein.

The shift sleeve 430 includes a recess 434 that mates with a shift fork 436. The shift fork 436 is included in an actuation assembly 438, in the illustrated example. Further, in the illustrated example, the actuation assembly 438 includes a shift rail 440 along which the shift fork 436 slides during clutch actuation. The actuation assembly 438 even further includes an actuation motor 442 that rotates a gear 444 that meshed with a cam gear 446 that is included in a set of cam gears 448. The set of cam gears 448 further include a cam gear 450 that is rotationally coupled to the cam gear 448. The cam gear 450 meshes with another cam gear 452. However, the cam gears may have a different configuration in other examples. For instance, the set of cam gears may include a greater or fewer number of gears. In the illustrated example, the cam gear 452 rotates on a shaft 454. The shaft 454 is rotationally coupled a cam plate 456. A shift pin 458 in the shift fork 436 mates with the cam plate 456. It will be understood, that rotation of the motor 442 causes the cam gears 448 and the cam plate 456 to move the shift fork 436 axially along the shift rail 440. In turn, movement of the shift fork 436 moves the clutch 432 into different positions (e.g., a first gear position, a second gear position, and a neutral position).

The shift sleeve 430 includes splines 460 that mate with splines 461 in a sun gear 462 in a first gear position. On the other hand, the splines 460 mate with splines 464 in a carrier 466 in a second gear position. The sun gear 462 and the carrier 466 are included in the multi-speed planetary gear set 414. The multi-speed planetary gear set 414 further includes a ring gear 468 that is grounded by the housing 426, in the illustrated example. Further, in the illustrated example, the carrier 466 includes a section 470 that is rotationally coupled to the output gear 410. The output gear 410 meshes with an input gear 472 of a differential 474. It will be understood that side gears 476 may be splined and/or otherwise rotationally coupled to axle shafts.

Figure 5B:
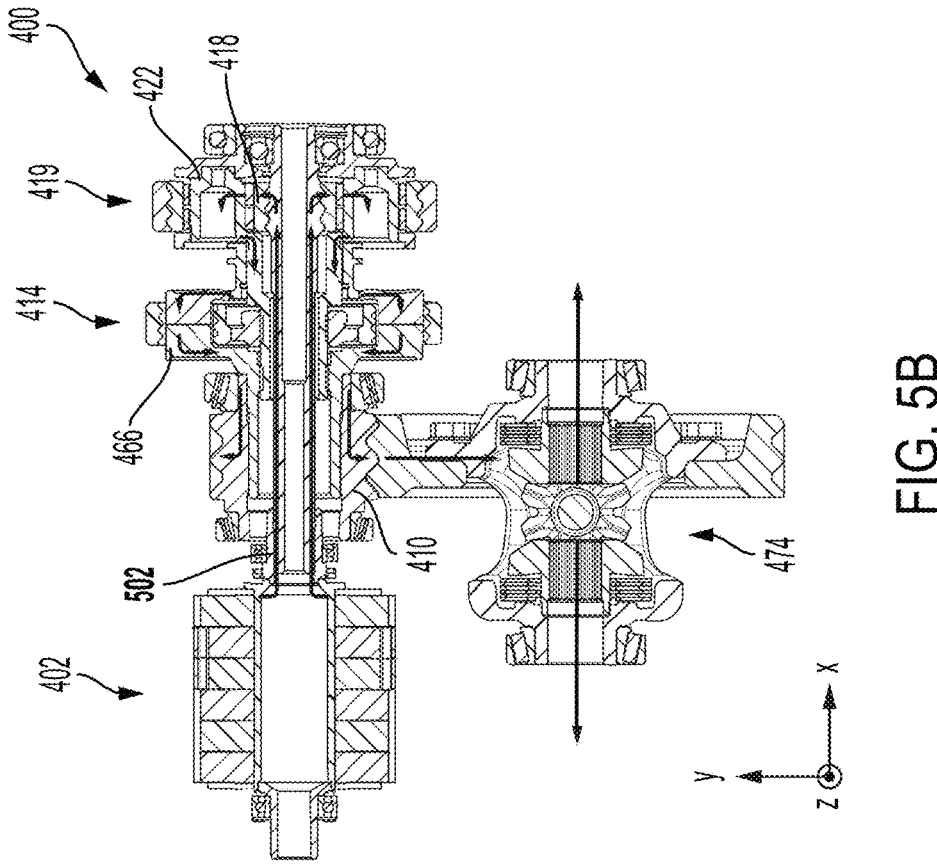
FIGS. 5A-5B shows power paths in the different operating modes of the electric axle depicted in FIG. 4.
Figure 5A:
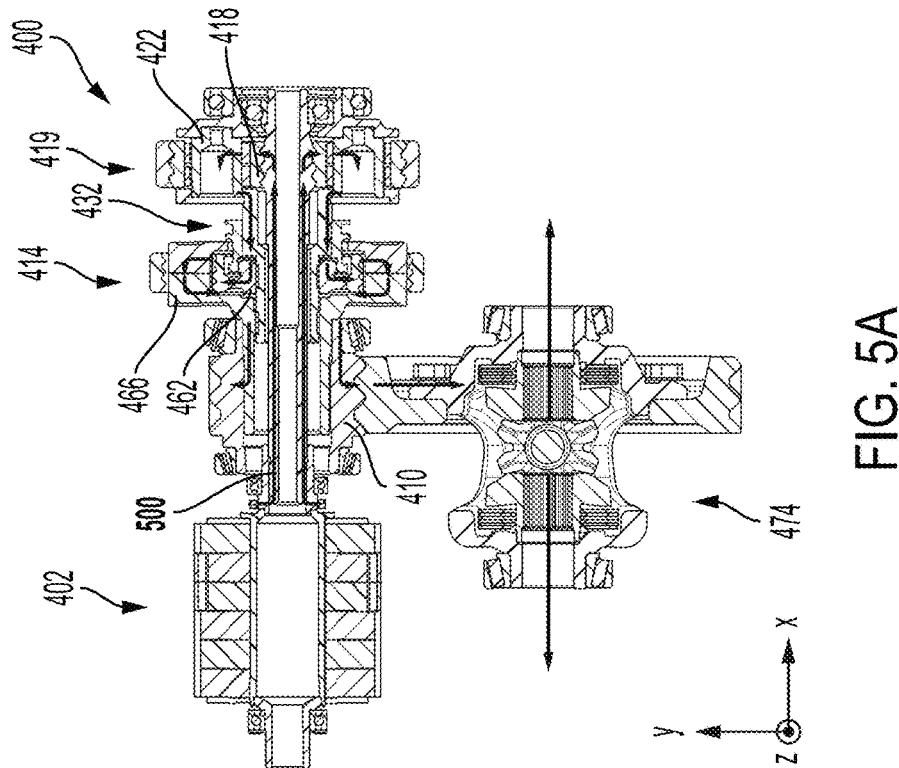

FIGS. 5A-5B show power paths 500 and 502, respectively, in the electric axle 400 in the first gear mode and the second gear mode, respectively. In both mechanical power paths 500 and 502, power travels from the traction motor 402 to the input planetary gear set 419 via the sun gear 418. Next, power travels from the carrier 422 of the input planetary gear set 419 to the multi-speed planetary gear set 414.

Specifically, in the power path 500, shown in FIG. 5A, power travels from the carrier 422 to the sun gear 462 via the clutch 432. Next power travels from the carrier 466 to the output gear 410.

In the power path 502, shown in FIG. 5B, power travels from the carrier 422 to the sun gear 462 via the clutch 432. Next power travels from the carrier 466 to the output gear 410.

In both power paths 500 and 502, power travels from the output gear 410 to the differential 474 and then to the axle shafts and drive wheels.

Figure 6:
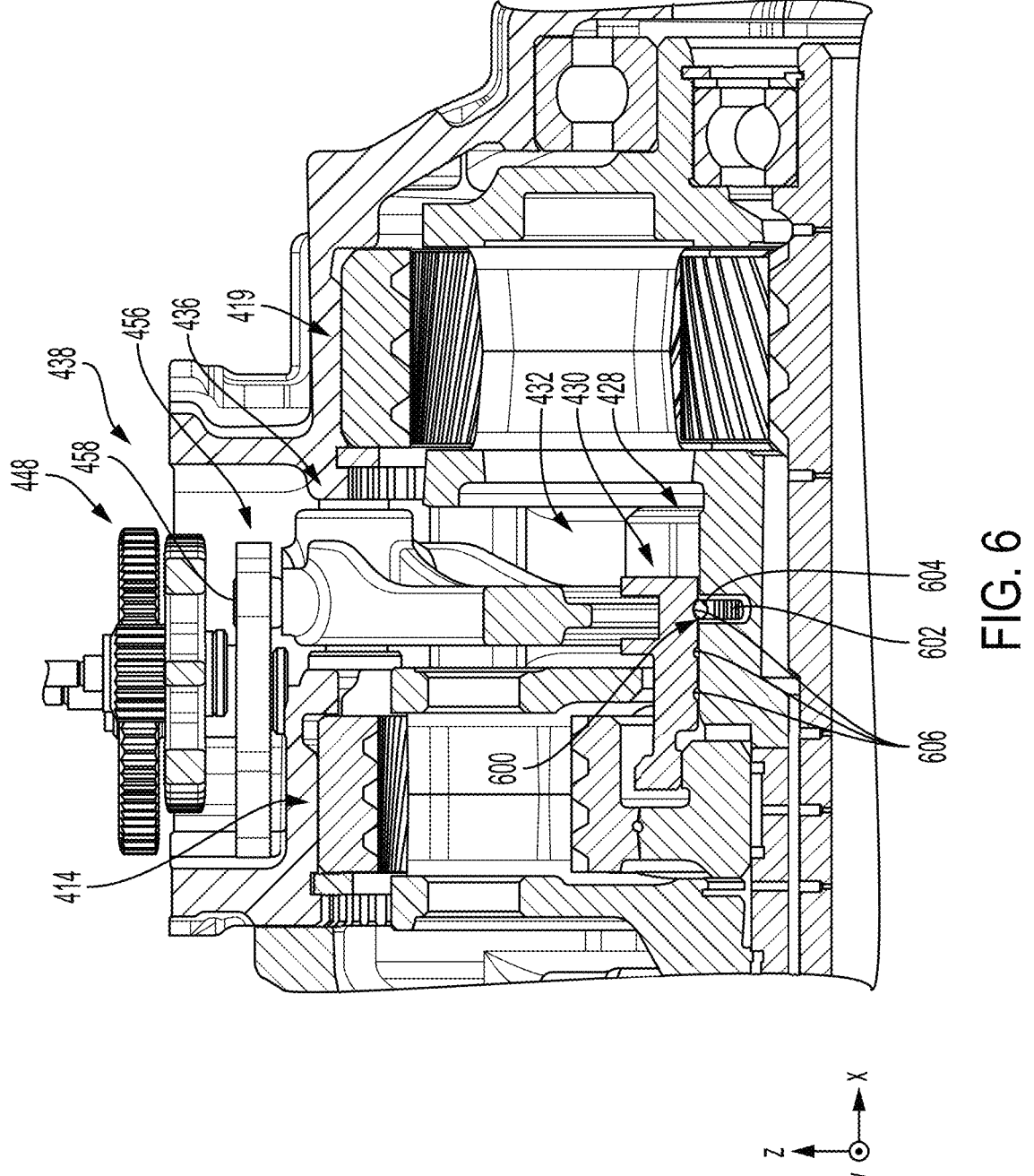
FIG. 6 shows a detailed side view of the shift assembly in the electric axle depicted in FIG. 4.

FIG. 6 shows a detailed view of the actuation assembly 438. The set of cam gears 448, the cam plate 456, and the shift fork 436 with the shift pin 458 that mates with the cam plate are again illustrated. The shift fork 436 mates with the shift sleeve 430 that allows the shift fork to axially translate the shift sleeve. The shift fork 436 is positioned axially between the input planetary gear set 419 and the multi-speed planetary gear set 414. Further, the set of cam gears 448 and the cam plate 456 are position vertically above the multi-speed planetary gear set 414, in the illustrated example. In this way, the compactness of the electric axle is increased. Specifically, arranging the clutch and its actuation assembly in this manner allows the axle's cross-vehicle packaging space to be reduced, thereby increasing custom appeal.

FIG. 6 further shows the carrier section 428 that includes a recess 600 with a spring 602 and a ball 604. Thus, the ball may be referred to as a spring loaded ball. The spring loaded ball 604 mates with detents 606 in the shift sleeve 430 in different clutch positions. Specifically, the detents 606 corresponding to the first gear position, the neutral position, and the second gear position of the shift sleeve 430 of the clutch 432.

Figure 7A:
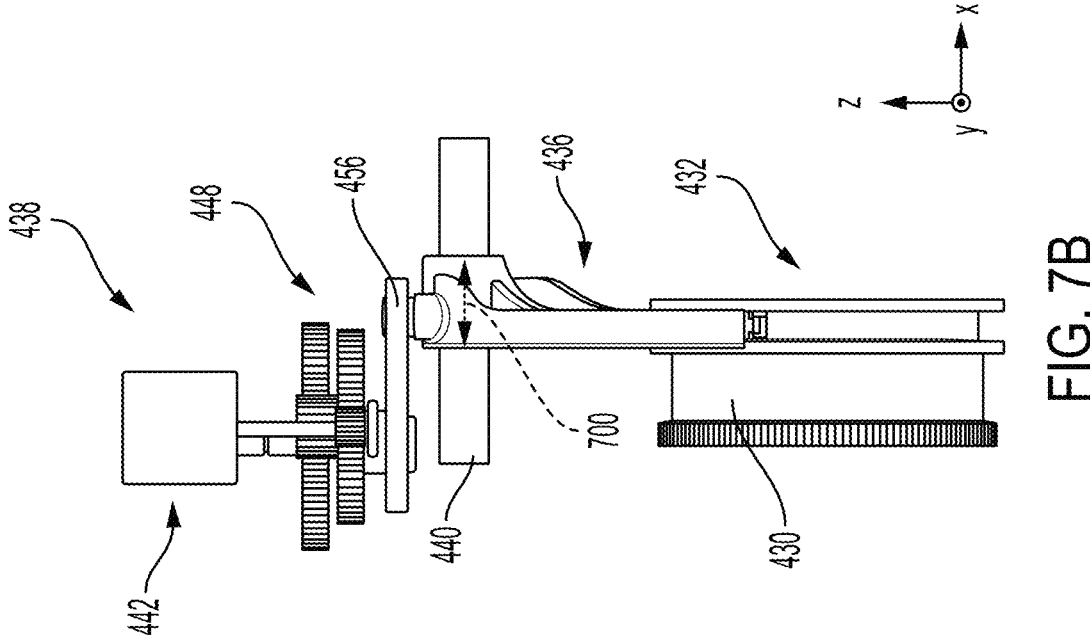
FIGS. 7A-7B show the shift assembly, depicted in FIG. 6, in different positions.
Figure 7B:
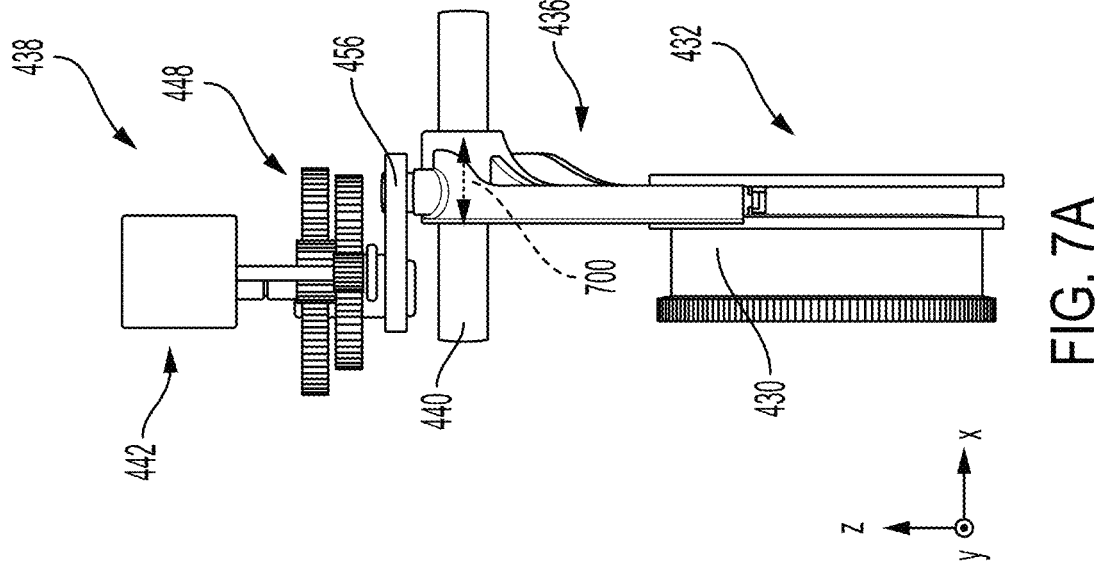

FIGS. 7A-7B show the clutch 432 in a first gear positon and a second gear position, respectively. It will be understood that the actuation assembly 438 induces the movement of the clutch 432 into the first and second gear positions. Specifically, the actuation motor 442 induces rotation of the cam gears 448 that rotate the cam plate 456. Rotation of the cam plate 456 causes axial translation of the shift fork 436 and therefore the shift sleeve 430. Arrows 700 indicates the shift fork's axial translation along the shift rail 440.

Figure 8:
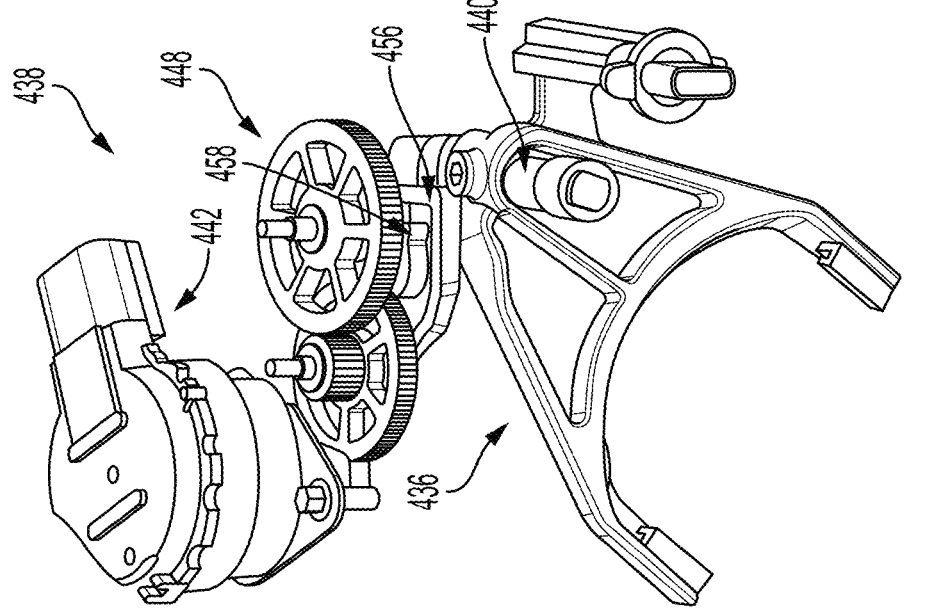
FIG. 8 shows a perspective view of the shift assembly, depicted in FIG. 6.
Figure 8:

FIG. 8 shows a perspective view of the actuation assembly 438 with the actuation motor 442, the set of cam gears 448, the cam plate 456, the shift fork 436, and the shift rail 440.

FIGS. 4-8 are drawn approximately to scale, aside from the schematically depicted components. However, the components may have alternate relative dimensions, in other embodiments.

FIGS. 1-8 show example configurations with relative positioning of the various components. However, the components may have other relative sizes, in other embodiments. It will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention is further described in the following paragraphs. In one aspect, an electric axle is provided that comprises a traction motor; and an input planetary gear set arranged coaxial to the traction motor and including: a sun gear rotationally coupled to the traction motor; and a carrier rotationally coupled to a shift sleeve; a multi-speed planetary gear set arranged coaxial to the input planetary gear set; and a shift assembly including the shift sleeve positioned axially between the input planetary gear set and the multi-speed planetary gear set; wherein the shift assembly is configured to: in a first positon, rotationally couple the carrier to a sun gear in the multi-speed planetary gear set; and in a second position, rotationally couple the carrier to a carrier in the multi-speed planetary gear set. In one example, the shift assembly may be configured to, in a neutral position, rotationally decoupled the input planetary gear set from the multi-speed planetary gear set. In another example, the shift assembly may include an actuation motor that is mechanically coupled to a shift fork that mates with a recess in the shift sleeve. In yet another example, the shift assembly may include: one or more cam gears rotationally coupled to the actuation motor; and a cam plate rotationally coupled to the one or more cam gears, wherein a shift pin in the shift fork mates with the cam plate. In another example, the electric axle may further comprise a shift fork position sensor coupled to a housing of the electric axle. In another example, the input planetary gear set may be a simple planetary gear set; and a ring gear in the input planetary gear set may be grounded. In another example, the electric axle may further comprise a differential rotationally coupled to a carrier of the multi-speed planetary gear set. In yet another example, the differential may be arranged coaxial to the input planetary gear set and the multi-speed planetary gear set. In another example, the differential may be arranged parallel to and offset from the input planetary gear set and the multi-speed planetary gear set. In another example, the electric axle may further comprise a spring loaded ball coupled to the second section and the shift sleeve. In yet another example, a ring gear in the multi-speed planetary gear set may be grounded.

In another aspect, an electric beam axle is provided that comprises a traction motor; and an input planetary gear set arranged coaxial to the traction motor and including: a sun gear rotationally coupled to the traction motor; a carrier including a section that is rotationally coupled to a shift sleeve; a multi-speed planetary gear set arranged coaxial to the input planetary gear set; and a shift assembly including a shift sleeve positioned axially between the input planetary gear set and the multi-speed planetary gear set; wherein the shift assembly is configured to: in a first positon, rotationally coupled the carrier to a sun gear in the multi-speed planetary gear set; in a second position, rotationally couple the carrier to a carrier in the multi-speed planetary gear set; and in a neutral position, rotationally decoupled the input planetary gear set from the multi-speed planetary gear set; and wherein the input planetary gear set and the multi-speed planetary gear set are simple planetary gear sets. In one example, the shift assembly may include: an actuation motor that is mechanically coupled to a shift fork that mates with a recess in the shift sleeve, wherein the shift fork is configured to translate on a shift rail; one or more cam gears rotationally coupled to the actuation motor; and a cam plate rotationally coupled to the one or more gears, wherein a shift pin in the shift fork mates with the cam plate. In another example, a ring gear in the input planetary gear set and a ring gear in the multi-speed planetary gear set may be both grounded. In yet another example, the electric beam axle may further comprise a differential rotationally coupled to a carrier of the multi-speed planetary gear set. In another example, the differential may be arranged coaxial to the input planetary gear set and the multi-speed planetary gear set. In yet another example, the differential may be arranged parallel to and offset from the input planetary gear set and the multi-speed planetary gear set. In yet another example, the shift assembly may include an actuation motor that is mechanically coupled to a shift fork that mates with a recess in the shift sleeve. In another example, the shift assembly may include: one or more cam gears rotationally coupled to the actuation motor; and a cam plate rotationally coupled to the one or more gears, wherein a shift pin in the shift fork mates with the cam plate. In even another example, the electric beam axle may further comprise a shift fork position sensor coupled to a housing of the electric axle; and a spring loaded ball coupled to the second section and the shift sleeve.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle, comprising:
a traction motor; and
an input planetary gear set arranged coaxial to the traction motor and including:
a sun gear rotationally coupled to the traction motor; and
a carrier rotationally coupled to a shift sleeve;
a multi-speed planetary gear set arranged coaxial to the input planetary gear set; and
a shift assembly including the shift sleeve positioned axially between the input planetary gear set and the multi-speed planetary gear set;
wherein the shift assembly is configured to:
in a first positon, rotationally couple the carrier to a sun gear in the multi-speed planetary gear set; and
in a second position, rotationally couple the carrier to a carrier in the multi-speed planetary gear set; and

11 in a neutral position, rotationally decouple the input planetary gear set from the multi-speed planetary gear set; and a section of the input planetary gear set carrier rotationally coupled to the shift sleeve; and a spring positioned below a ball in a recess of the section of the input Planetary gear set carrier;

wherein the ball mates with detents in the shift sleeve;

wherein the detents correspond to the first position, the second position, and the neutral position of the shift assembly;

wherein the shift assembly includes an actuation motor that is mechanically coupled to a shift fork that mates with a recess in the shift sleeve;

wherein the shift assembly includes:

one or more cam gears rotationally coupled to the actuation motor; and a cam plate positioned vertically below and rotationally coupled to the one or more cam gears;

wherein a shift pin in the shift fork mates with the cam plate.

2. The electric axle of claim 1, further comprising a shift fork position sensor coupled to a housing of the electric axle.

3. The electric axle of claim 1, wherein:

the input planetary gear set is a simple planetary gear set; and a ring gear in the input planetary gear set is grounded.

4. The electric axle of claim 1, further comprising a differential rotationally coupled to the carrier of the multi-speed planetary gear set.

5. The electric axle of claim 4, wherein the differential is arranged coaxial to the input planetary gear set and the multi-speed planetary gear set.

6. The electric axle of claim 4, wherein the differential is arranged parallel to and offset from the input planetary gear set and the multi-speed planetary gear set.

7. The electric axle of claim 1, wherein a ring gear in the multi-speed planetary gear set is grounded.

8. An electric beam axle, comprising:

a traction motor; and an input planetary gear set arranged coaxial to the traction motor and including:

a sun gear rotationally coupled to the traction motor;

a carrier including a section that is rotationally coupled to a shift sleeve;

a multi-speed planetary gear set arranged coaxial to the input planetary gear set;

a shift assembly including the shift sleeve positioned axially between the input planetary gear set and the multi-speed planetary gear set;

a section of the input planetary gear set carrier rotationally coupled to the shift sleeve; and a spring positioned below a ball in a recess of the section of the input planetary gear set carrier;

wherein the shift assembly is configured to:

in a first positon, rotationally coupled the carrier to a sun gear in the multi-speed planetary gear set;

in a second position, rotationally couple the carrier to a carrier in the multi-speed planetary gear set; and in a neutral position, rotationally decoupled the input planetary gear set from the multi-speed planetary gear set; and wherein the input planetary gear set and the multi-speed planetary gear set are simple planetary gear sets;

wherein the ball mates with detents in the shift sleeve;

wherein the detents correspond to the first position, the second position, and the neutral position of the shift assembly;

wherein the shift assembly includes an actuation motor that is mechanically coupled to a shift fork that mates with a recess in the shift sleeve;

wherein the shift assembly includes:

one or more cam gears rotationally coupled to the actuation motor; and a cam plate positioned vertically below and rotationally coupled to the one or more cam gears;

wherein a shift pin in the shift fork mates with the cam plate.

9. The electric beam axle of claim 8, wherein a ring gear in the input planetary gear set and a ring gear in the multi-speed planetary gear set are both grounded.

10. The electric beam axle of claim 9, further comprising a differential rotationally coupled to a carrier of the multi-speed planetary gear set.

11. The electric beam axle of claim 10, wherein the differential is arranged coaxial to the input planetary gear set and the multi-speed planetary gear set.

12. The electric beam axle of claim 10, wherein the differential is arranged parallel to and offset from the input planetary gear set and the multi-speed planetary gear set.

13. The electric beam axle of claim 10, wherein the shift assembly includes an actuation motor that is mechanically coupled to a shift fork that mates with a recess in the shift sleeve.

* * * * *